United States Patent
Xu et al.

(10) Patent No.: US 9,963,166 B2
(45) Date of Patent: May 8, 2018

(54) STEERING POWER SYSTEM FOR ELECTRIC VEHICLE AND METHOD CONTROLLING SAME

(71) Applicant: BYD COMPANY LIMITED, Shenzhen, Guangdong (CN)

(72) Inventors: Jinze Xu, Guangdong (CN); Xingchi Wu, Guangdong (CN); Wengang Luo, Guangdong (CN); Chao Zhang, Guangdong (CN); Hongjun Wang, Guangdong (CN); Zhenpai Luan, Guangdong (CN)

(73) Assignee: BYD Company Limited, Shenzhen (CN)

( * ) Notice: Subject to any disclaimer, the term of this patent is extended or adjusted under 35 U.S.C. 154(b) by 0 days. days.

(21) Appl. No.: 15/316,069

(22) PCT Filed: Nov. 13, 2015

(86) PCT No.: PCT/CN2015/094606
§ 371 (c)(1),
(2) Date: Dec. 2, 2016

(87) PCT Pub. No.: WO2016/078552
PCT Pub. Date: May 26, 2016

(65) Prior Publication Data
US 2017/0106899 A1    Apr. 20, 2017

(30) Foreign Application Priority Data

Nov. 17, 2014 (CN) .......................... 2014 1 0653379

(51) Int. Cl.
*B62D 5/04* (2006.01)
*B60L 1/00* (2006.01)
*H02P 4/00* (2006.01)

(52) U.S. Cl.
CPC .............. *B62D 5/0481* (2013.01); *B60L 1/00* (2013.01); *B62D 5/046* (2013.01); *H02P 4/00* (2013.01);
(Continued)

(58) Field of Classification Search
CPC .............. B60L 11/1868; B60L 11/1811; B60L 2210/10; B60L 1/00; B60L 2210/12;
(Continued)

(56) References Cited

U.S. PATENT DOCUMENTS 6,923,279 B2 *   8/2005   Shimane ................. B60K 6/28
                                                                180/65.1
8,280,589 B2 *  10/2012   Iwasaki ................. B62D 5/046
                                                                180/443

(Continued)

FOREIGN PATENT DOCUMENTS

| CN | 101258068  | 9/2008  |
| CN | 101883706  | 11/2010 |
| CN | 103818329  | 5/2014  |
| CN | 103879443  | 6/2014  |
| JP | 2010018183 | 1/2010  |

OTHER PUBLICATIONS

International Search Report from PCT/CN2015/094606 dated Feb. 16, 2016.

*Primary Examiner* — Bentsu Ro
*Assistant Examiner* — Thai Dinh
(74) *Attorney, Agent, or Firm* — Calfee, Halter & Griswold LLP

(57) ABSTRACT

A steering power system for an electric vehicle and a method for controlling same are provided. The steering power system includes: a steering motor; a steering motor controller, configured to control the steering motor; a high voltage power battery, configured to output a first voltage; a low voltage storage battery, configured to output a second voltage; a buck DC-DC converter, configured to convert the first (Continued)

voltage into the second voltage for being supplied to the low voltage storage battery when a high voltage system works; and a boost DC-DC converter, configured to convert the second voltage into the first voltage. When the high voltage system has an abnormal power failure, the boost DC-DC converter converts the second voltage outputted from the low voltage storage battery into the first voltage for being supplied to the steering motor controller.

16 Claims, 4 Drawing Sheets

(52) U.S. Cl.
CPC ....... *B60L 2210/12* (2013.01); *B60L 2210/14* (2013.01); *B60Y 2200/91* (2013.01); *B60Y 2400/112* (2013.01)

(58) Field of Classification Search
CPC .. B60L 2210/14; B60L 2240/54; H02P 27/06; H02P 4/00; B62D 5/046; B62D 5/0481
See application file for complete search history.

(56) References Cited

U.S. PATENT DOCUMENTS

| | | | |
|---|---|---|---|
| 8,381,869 B2* | 2/2013 | Fujimoto | B62D 5/046 180/443 |
| 2008/0177444 A1* | 7/2008 | Tachibana | B62D 5/0457 701/41 |
| 2008/0234897 A1* | 9/2008 | Tsuchida | B60W 50/029 701/42 |
| 2008/0277191 A1 | 11/2008 | Kasai | |
| 2009/0140673 A1* | 6/2009 | Kasai | B62D 5/046 318/139 |
| 2010/0006360 A1 | 1/2010 | Kishimoto | |
| 2010/0264857 A1 | 10/2010 | Nagase | |
| 2011/0035107 A1 | 2/2011 | Izutani et al. | |
| 2011/0040450 A1 | 2/2011 | Izutani et al. | |
| 2011/0203869 A1* | 8/2011 | Tanaka | B62D 5/046 180/443 |
| 2012/0169143 A1 | 7/2012 | Nakagawa et al. | |
| 2014/0174844 A1 | 6/2014 | Nakai | |

* cited by examiner

STEERING POWER SYSTEM FOR ELECTRIC VEHICLE AND METHOD CONTROLLING SAME

CROSS REFERENCE TO RELATED APPLICATION

This application is a national phase of International Application No. PCT/CN2015/094606 filed Nov. 13, 2015, which claims priority and benefits of Chinese Patent Application No. 201410653379.6, filed with State Intellectual Property Office, P.R.C. on Nov. 17, 2014, the entire content of which is incorporated herein by reference.

FIELD

Embodiments of the present disclosure generally relate to an electric vehicle, and more particularly, to a steering power system for an electric vehicle and a method for controlling a steering power system for an electric vehicle.

BACKGROUND

Nowadays, a steering power system for an electric vehicle is mostly provided with power by a high voltage system of the electric vehicle, which can improve a performance of the steering power system. However, a sudden power failure of the high voltage system of the electric vehicle may cause the steering power system to not work, and thus the user is difficult to turn the steering wheel, which can lead to some security risks.

SUMMARY

Embodiments of the present disclosure seek to solve at least one of the problems existing in the related art to at least some extent.

Embodiments of a first aspect of the present disclosure provide a steering power system for an electric vehicle. The steering power system includes: a steering motor; a steering motor controller, connected with the steering motor and configured to control the steering motor; a high voltage power battery, configured to output a first voltage value; a low voltage storage battery, configured to output a second voltage lower than the first voltage; a buck DC-DC converter, connected with the high voltage power battery and the low voltage storage battery respectively, and configured to convert the first voltage outputted from the high voltage power battery into the second voltage for being supplied to the low voltage storage battery when a high voltage system of the electric vehicle is working; and a boost DC-DC converter, connected with the low voltage storage battery and the steering motor controller respectively, and configured to convert the second voltage outputted from the low voltage storage battery into the first voltage, wherein when the high voltage system of the electric vehicle has an abnormal power failure, the boost DC-DC converter converts the second voltage outputted from the low voltage storage battery into the first voltage for being supplied to the steering motor controller.

With the steering power system for an electric vehicle according to embodiments of the present disclosure, when the high voltage system of the electric vehicle has the abnormal power failure, the boost DC-DC converter can convert the second voltage outputted from the low voltage storage battery into the first voltage for being supplied to the steering motor controller, such that the steering motor can still work for a short time when the abnormal power failure occurs to the high voltage system, thus avoiding a potential safety risk caused by a difficult turning for the steering wheel, improving a driving safety of the electric vehicle and meeting needs of users.

Embodiments of a second aspect of the present disclosure provide a method for controlling a steering power system for an electric vehicle. The method includes: providing a first voltage by a high voltage power battery; converting the first voltage provided by the high voltage power battery into a second voltage lower than the first voltage and supplying the second voltage to a low voltage storage battery by a buck DC-DC converter, when a high voltage system of the electric vehicle is working; and converting the second voltage provided by the low voltage storage battery into the first voltage and supplying the first voltage to a steering motor controller by a boost DC-DC converter.

With the method for controlling a steering power system for an electric vehicle according to embodiments of the present disclosure, when the high voltage system of the electric vehicle has the abnormal power failure, the boost DC-DC converter can convert the second voltage outputted from the low voltage storage battery into the first voltage for being supplied to the steering motor controller, such that the steering motor can still work for a short time when the power failure occurs to the high voltage system, thus avoiding a potential safety risk caused by a difficult turning for the steering wheel, improving a driving safety of the electric vehicle and meeting needs of users.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
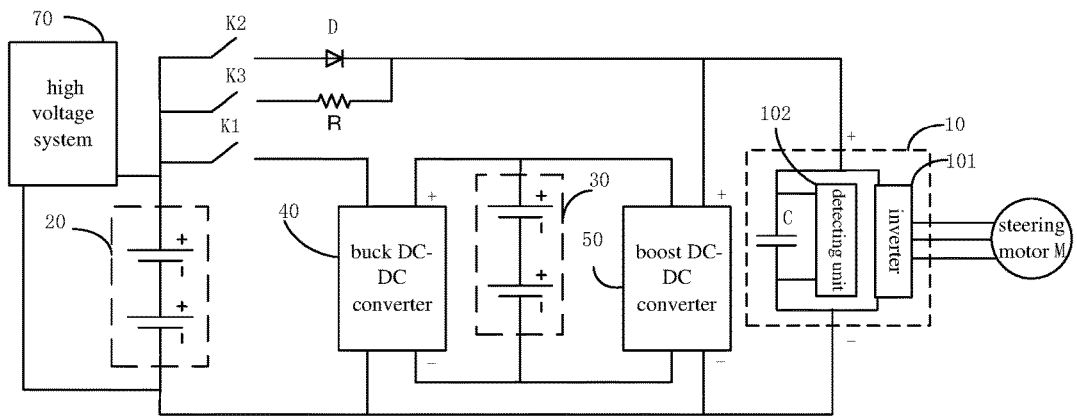
FIG. 1 is a schematic diagram of a steering power system for an electric vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, unless specified or limited otherwise, it should be noted that, terms "mounted," "connected" and "coupled" may be understood broadly, such as electronic connections or mechanical connections, inner communications between two elements, direct connections or indirect connections through intervening structures, which can be understood by those skilled in the art according to specific situations.

With reference to the following descriptions and drawings, these and other aspects of embodiments of the present disclosure will become apparent. In the descriptions and drawings, some particular embodiments are described in order to show the principles of embodiments according to the present disclosure, however, it should be appreciated that the scope of embodiments according to the present disclosure is not limited herein. On the contrary, changes, alternatives, and modifications can be made in the embodiments without departing from spirit, principles and scope of the attached claims.

In the following, a steering power system for an electric vehicle and a method for controlling a steering power system for an electric vehicle are described in detail with reference to drawings.

FIG. 1 is a schematic diagram of a steering power system for an electric vehicle according to an embodiment of the present disclosure. As shown in FIG. 1, the steering power system includes a steering motor M, a steering motor controller 10, a high voltage power battery 20, a low voltage storage battery 30, a buck DC-DC converter 40, and a boost DC-DC converter 50.

The steering motor controller 10 is connected with the steering motor M and is configured to control the steering motor M. The high voltage power battery 20 is connected with the steering motor controller 10 and is configured to output a high voltage for being supplied to the steering motor controller 10. The low voltage storage battery 30 is configured to output a low voltage. The buck DC-DC converter 40 is connected with the high voltage power battery 20, the low voltage storage battery 30 and the steering motor controller 10 respectively, and is configured to convert the high voltage outputted from the high voltage power battery 20 into the low voltage for being supplied to the low voltage storage battery 30, when a high voltage system 70 of the electric vehicle is working. The boost DC-DC converter 50 is connected with the low voltage storage battery 30 and the steering motor controller 10 respectively, and is configured to convert the low voltage outputted from the low voltage storage battery 30 into the high voltage. When the high voltage system 70 of the electric vehicle has an abnormal power failure, the boost DC-DC converter 50 converts the low voltage outputted from the low voltage storage battery 30 into the high voltage for being supplied to the steering motor controller 10.

In an embodiment, as shown in FIG. 1, the steering motor controller 10 includes: a direct current bus capacitor C i.e. a pre-charging capacitor, an inverter 101, and a detecting unit 102. The direct current bus capacitor C is connected with direct current input terminals of the inverter 101 in parallel, and the detecting unit 102 is configured to detect a voltage of the direct current bus capacitor C.

Figure 2:
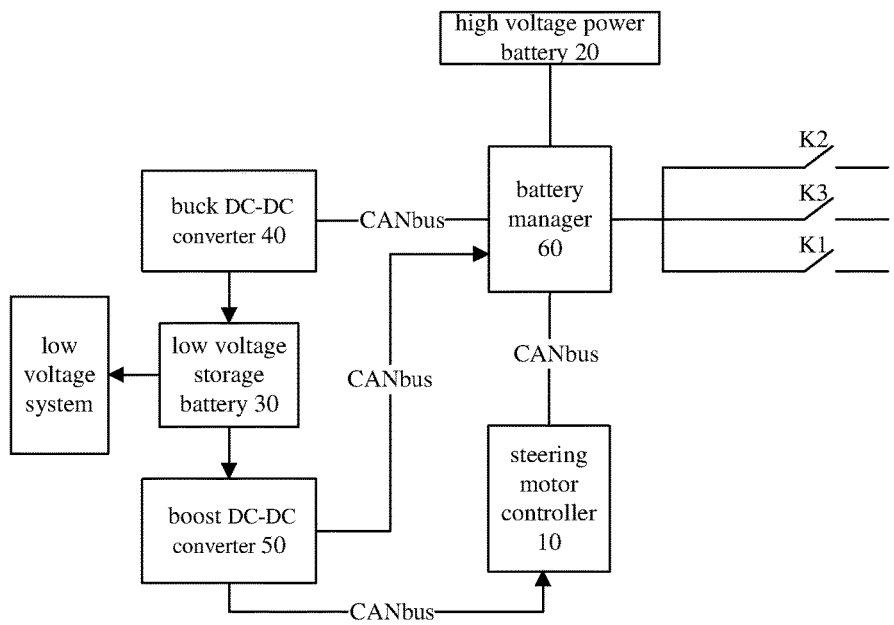
FIG. 2 is a schematic diagram showing a communication network of a steering power system for an electric vehicle according to an embodiment of the present disclosure.

FIG. 2 is a schematic diagram showing a communication network of a steering power system for an electric vehicle according to another embodiment of the present disclosure. The steering power system further includes a battery manager 60. The battery manager 60 is connected with the steering motor controller 10, the buck DC-DC converter 40 and the boost DC-DC converter 50 respectively via a CAN bus, and is configured to send a power off notification message to control the high voltage system 70 of the electric vehicle to stop working, and then the steering motor controller 10 detects that the voltage of the direct current bus capacitor steadily drops. The battery manager 60 is configured to detect state information of the high voltage power battery 20. The state information of the high voltage power battery 20 includes a total voltage, a current and a temperature of the high voltage power battery 20.

Figure 3:
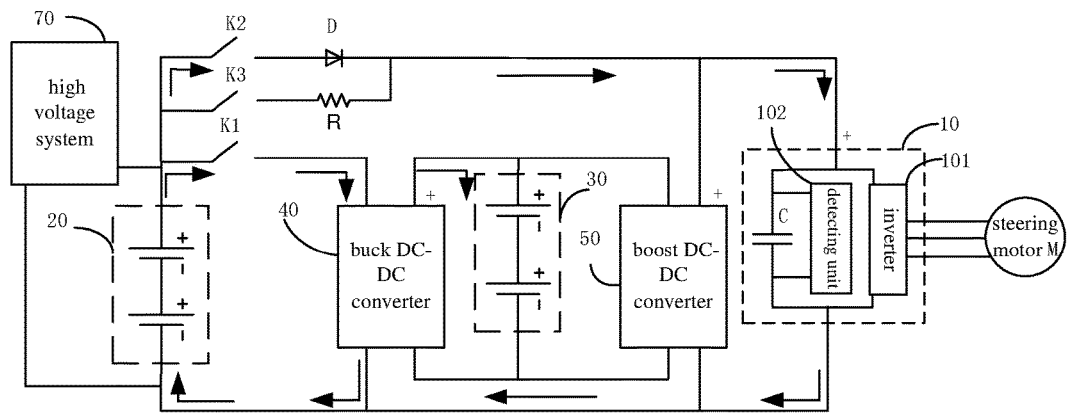
FIG. 3 is a schematic diagram of a steering power system for an electric vehicle when a buck DC-DC converter is working according to an embodiment of the present disclosure.

FIG. 3 is a schematic diagram of a steering power system for an electric vehicle when a buck DC-DC converter is working according to an embodiment of the present disclosure. The battery manager 60 is configured to: control the high voltage power battery 20 to supply power to the steering motor controller 10 independently and control the buck DC-DC converter 40 to work when the high voltage system 70 of the electric vehicle is working; control the boost DC-DC converter 50 to be in a standby state. The battery manager 60 controlling the buck DC-DC converter 40 to work means that, the buck DC-DC converter 40 converts the high voltage outputted from the high voltage power battery 20 into the low voltage for being supplied to the low voltage storage battery 30.

Figure 4:
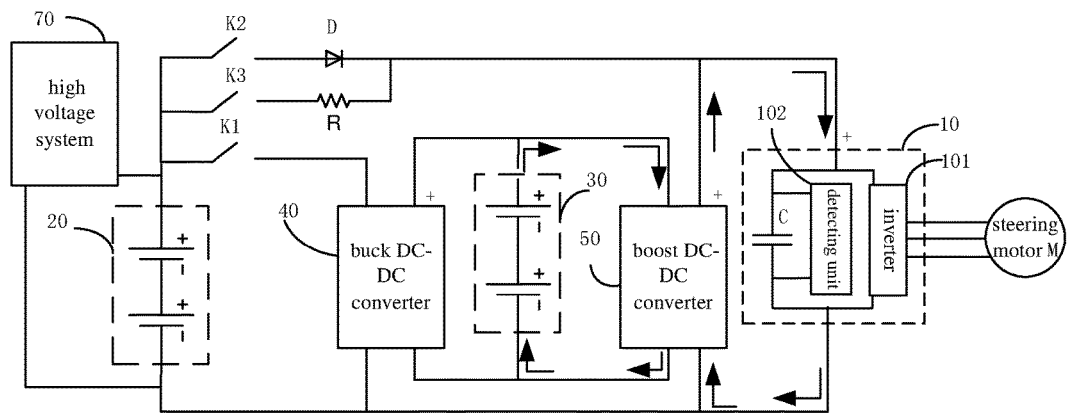
FIG. 4 is a schematic diagram of a steering power system for an electric vehicle when a boost DC-DC converter is working according to an embodiment of the present disclosure.

FIG. 4 is a schematic diagram of a steering power system for an electric vehicle when a boost DC-DC converter is working according to an embodiment of the present disclosure. The battery manager 60 is configure to determine that the high voltage system 70 of the electric vehicle has the abnormal power failure when the voltage of the direct current bus capacitor C is less than a first predetermined voltage and the power off notification message is not sent by the battery manager 60, and then control the boost DC-DC converter 50 to work. The battery manager 60 controlling the boost DC-DC converter 50 to work means that, the boost DC-DC converter 50 converts the low voltage outputted from the low voltage storage battery 30 into the high voltage for being supplied to the steering motor controller 10, such that the steering motor controller 10 may keep working for a short time.

Specifically, the high voltage power battery 20 is a power storage device mounted on the electric vehicle for providing power to the electric vehicle and other high voltage electrical equipment on the electric vehicle, which can be recharged for many times. The low voltage storage battery 30 may be the low voltage storage component on the electric vehicle and is provided with power by the high voltage power battery 20. When the abnormal power failure occurs to the high voltage power battery 20, the voltage of the low voltage storage battery 30 is boost by the boost DC-DC converter 50 and is supplied to the steering motor M. In an embodiment, the low voltage storage battery 30 is further configured to supply power to a low voltage system of the electric vehicle.

In an embodiment, the steering motor controller 10 converts the direct current from the high voltage power battery 20 into three-phase alternating current so as to supply power to the steering motor M, thus controlling the steering motor M, and converts the direct current from the boost DC-DC converter 50 into three-phase alternating current so as to supply power to the steering motor M. The steering motor M is the electrical equipment for providing a steering power for the electric vehicle and is controlled and provided with power by the steering motor controller 10. The battery manager 60 can sample a temperature, a voltage, a charging current and a discharging current for the high voltage power battery 20, calculate a remaining capacity of the high voltage power battery 20, and send control signals to related electrical components via the CAN bus, so as to manage the high voltage power battery 20. In addition, when a serious failure occurs to the high voltage power battery 20, the battery manager 60 can send the power off notification message. When the electric vehicle is normally powered off, the battery manager 60 also can send the power off notification message.

In an embodiment, as shown in FIG. 1, input terminals of the buck DC-DC converter 40 are connected with the high voltage power battery 20 in parallel via a first DC-DC connector K1, output terminals of the buck DC-DC converter 40 are connected with the low voltage storage battery 30 in parallel, input terminals of the boost DC-DC converter 50 are connected with the low voltage storage battery 30 in parallel, output terminals of the boost DC-DC converter 50 are connected with the direct current bus capacitor C in parallel, and the high voltage power battery 30 is connected with the direct current bus capacitor C in parallel. That is, a first input terminal of the buck DC-DC converter 40 is connected with a positive terminal of the high voltage power battery 20 via the first DC-DC connector K1, and a second input terminal of the buck DC-DC converter 40 is connected with a negative terminal of the high voltage power battery 20; a first output terminal of the buck DC-DC converter 40 is connected with a positive terminal of the low voltage storage battery 30, and a second output terminal of the buck DC-DC converter 40 is connected with a negative terminal of the low voltage storage battery 30; a first input terminal of the boost DC-DC converter 50 is connected with the positive terminal of the low voltage storage battery 30, and a second input terminal of the boost DC-DC converter 50 is connected with the negative terminal of the low voltage storage battery 30; a first output terminal of the boost DC-DC converter 50 is connected with a first terminal of the direct current bus capacitor C, and a second output terminal of the boost DC-DC converter 50 is connected with a second terminal of the direct current bus capacitor C.

Furthermore, as shown in FIG. 1, the steering power system of the electric vehicle further includes a steering contactor K2 and a diode D. The steering contactor K2 has a first terminal connected with the positive terminal of the high voltage power battery 20 and a second terminal. The diode D has an anode connected with the second terminal of the steering contactor K2 and a cathode connected with the first terminal of the direct current bus capacitor C, in which the second terminal of the direct current bus capacitor C is connected with the negative terminal of the high voltage power battery 20. In addition, the steering power system of the electric vehicle further includes a steering pre-charging contactor K3 and a pre-charging resistor R. The steering pre-charging contactor K3 has a first terminal connected with the first terminal of the steering contactor K2 and a second terminal. The pre-charging resistor R has a first terminal connected with the second terminal of the steering pre-charging contactor K3 and a second terminal connected with the cathode of the diode D. In other words, the steering pre-charging contactor K3 and the pre-charging resistor R are connected in series and then connected with the series-connected the diode D and the steering contactor K2 in parallel.

In an embodiment, the diode D is high-power diode which can prevent the boost DC-DC converter 50 from supplying power to other high voltage electrical equipment, the pre-charging resistor R is used to restrict the pre-charging current in the process of supplying power to the steering motor M. The connectors K1, K2, K3 which are controlled by the battery manager 60 via level signals are used to switch on or off a power supply loop.

In an embodiment, the direct current bus capacitor C, which is inside of the steering motor controller 10 and is connected with direct current input terminals of the inverter 101 in parallel, is used to indicate a voltage value of the input terminal of the steering motor M. The voltage of the direct current bus capacitor C is relatively lower, which indicates that the steering motor M is disconnected with the high voltage system 70.

In an embodiment, as shown in FIG. 3, in a normal situation, once the electric vehicle is provided with a high voltage power, the battery manager 60 controls the steering pre-charging contactor K3 to turn on, the high voltage power battery 20 charges the direct current bus capacitor C, and the steering motor controller 10 detects the voltage of the direct current bus capacitor C in a real time and sends the voltage information of the direct current bus capacitor C to the battery manager 60 via the CAN bus. The battery manager 60 determines whether the voltage of the direct current bus capacitor C is larger than a second predetermined voltage (such as 90% of the total voltage of the high voltage power battery 20) after a time delay, if yes, the battery manager 60 controls the steering contactor K2 to turn on, the steering motor M is working normally, at the same time, the steering pre-charging contactor K3 is controlled to be turned off; if no, it is determined that the voltage of the direct current bus capacitor C of the steering motor controller 10 is too low, such that the steering motor controller 10 cannot work normally, i.e., the steering motor M cannot work normally.

In an embodiment, when the steering motor M is working normally, the battery manager 60 controls the first DC-DC connector K1 to turn on, and after receiving turn-on information of the first DC-DC connector K1 from the battery manager 60, the buck DC-DC converter 40 starts to work, as shown in FIG. 3, the high-voltage system mainly includes two discharging loops: (1) the positive terminal of the high voltage power battery 20→the steering contactor K2→the diode D→the positive terminal of the steering motor controller 10→the negative terminal of the steering motor controller 10→the negative terminal of the high voltage power battery 20; (2) the positive terminal of the high voltage power battery 20→the first DC-DC connector K1→the buck DC-DC converter 40→the negative terminal of the high voltage power battery 20. At this time, the high voltage power battery 20 supply power to the steering motor controller 10, the steering motor M is working normally, at the same time, the battery manager 60 controls the buck DC-DC converter 40 to work, such that the high voltage power battery 20 can charge the low voltage storage battery 30 via the buck DC-DC converter 40, the boost DC-DC converter is in the standby mode. In this process, if only the electric vehicle runs normally, the high voltage power battery 20 may keep charging the low voltage storage battery 30 via the buck DC-DC converter 40, and the low voltage storage battery 30 provides low DC voltage (such as 24V) to the low voltage electrical equipment on the electric vehicle.

In an embodiment, the battery manager 60 receives the voltage information of the direct current bus capacitor C from the steering motor controller 10 and sends the power off notification message when the power-off condition is met. When the voltage value is less than the first predetermined voltage (such as 80% of the total voltage of the high voltage power battery 20) and the power off notification message is not sent by the battery manager 60, the battery manager 60 determines that the high voltage system 70 of the electric vehicle has the abnormal power failure, and then controls the boost DC-DC converter 50 to work. As shown in FIG. 4, a discharging loop is: the first terminal (i.e., the positive terminal) of the boost DC-DC converter 50→the positive terminal of the steering motor controller 10→the negative terminal of the steering motor controller 10→the second terminal (i.e., the negative terminal) of the boost DC-DC converter 50. At this time, the boost DC-DC converter 50 converts the low voltage outputted from the low voltage storage battery 30 into the high voltage for being supplied to the steering motor controller 10, so as to control the steering motor M to work for a short time. When the received voltage value of the direct current bus capacitor C is less than the first predetermined voltage (such as 80% of the total voltage of the high voltage power battery 20) and the battery manager 60 sends the power off notification message, the battery manager 60 determines the high voltage of the electric vehicle is powered off normally.

Figure 5:
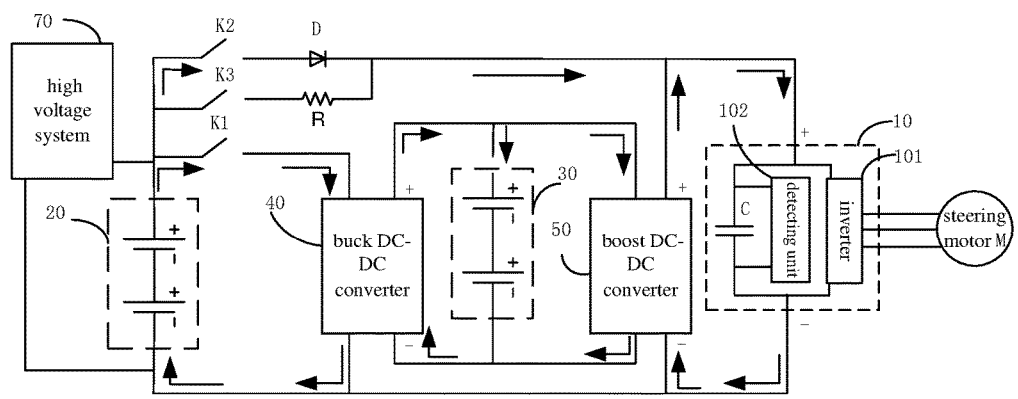
FIG. 5 is a schematic diagram showing a working principle of a steering power system for an electric vehicle according to an embodiment of the present disclosure.

FIG. 5 is a schematic diagram showing a working principle of a steering power system for an electric vehicle according to an embodiment of the present disclosure. As shown in FIG. 5, the boost DC-DC converter 50 and the buck DC-DC converter 40 work simultaneously, the high-voltage system mainly includes three discharging loops: (1) the positive terminal of the high voltage power battery 20→the steering contactor K2→the diode D→the positive terminal of the steering motor controller 10→the negative terminal of the steering motor controller 10→the negative terminal of the high voltage power battery 20; (2) the positive terminal of the high voltage power battery 20→the first DC-DC connector K1→the buck DC-DC converter 40→the negative terminal of the high voltage power battery 20; (3) the first terminal (i.e., the positive terminal) of the boost DC-DC converter 50→the positive terminal of the steering motor controller 10→the negative terminal of the steering motor controller 10→the second terminal (i.e., the negative terminal) of the boost DC-DC converter 50. When the high voltage of the electric vehicle is working, the buck DC-DC converter 40 converts the high voltage from the high voltage power battery 20 into the low voltage for charging the low voltage storage battery 30, at the same time, the boost DC-DC converter 50 converts the second voltage outputted from the low voltage storage battery 30 into the high voltage for supplying power to the steering motor controller 10, such that the boost DC-DC converter 50 and the high voltage power battery 20 supply power to the steering motor controller 10 simultaneously. When the high voltage system 70 of the electric vehicle has the abnormal power failure, the boost DC-DC converter 50 provides power to the steering motor controller 10 independently. In this embodiment, the boost DC-DC converter 50 is in the working state without any judgment, and once the high voltage system 70 of the electric vehicle has the abnormal power failure, the boost DC-DC converter 50 may respond immediately, thus supplying power to the steering motor M without interruption.

Figure 6:
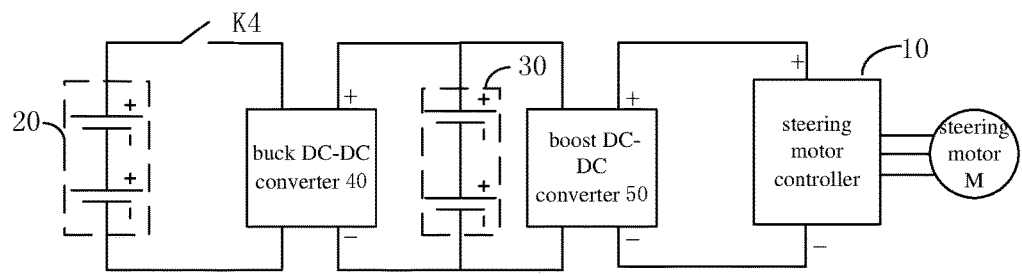
FIG. 6 is a schematic diagram of a steering power system for an electric vehicle according to another embodiment of the present disclosure.

FIG. 6 is a schematic diagram of a steering power system for an electric vehicle according to another embodiment of the present disclosure. In this embodiment, the steering power system includes a steering motor M, a steering motor controller 10, a high voltage power battery 20, a low voltage storage battery 30, a buck DC-DC converter 40, and a boost DC-DC converter 50. Input terminals of the buck DC-DC converter 40 are connected with the high voltage power battery 20 in parallel via a second DC-DC connector K4, output terminals of the buck DC-DC converter 40 are connected with the low voltage storage battery 30 in parallel, input terminals of the boost DC-DC converter 50 are connected with the low voltage storage battery 30 in parallel, and output terminals of the boost DC-DC converter 50 are connected with the steering motor controller 10 in parallel, and the steering motor controller 10 is connected with the steering motor M.

The steering power system further includes a battery manager. It should be noted that, a connecting relationship of the battery manager involved in this embodiment is similar to the embodiment described above with reference to FIG. 2, thus the battery manager is not shown in FIG. 6 for purpose of simplicity. The battery manager is connected with the steering motor controller 10, the buck DC-DC converter 40 and the boost DC-DC converter 50 respectively via a CAN bus, and is configured to send a power off notification message to control the high voltage system of the electric vehicle to stop working, and then the steering motor controller 10 detects that the voltage of the direct current bus capacitor steadily drops. The battery manager is configured to detect state information of the high voltage power battery 20. The state information of the high voltage power battery 20 includes a total voltage, a current and a temperature of the high voltage power battery 20.

In this embodiment, when the high voltage system of the electric vehicle is working, the battery manager controls the buck DC-DC converter 40 to convert the first voltage outputted from the high voltage power battery into the second voltage to charge the low voltage storage battery 30, and controls the boost DC-DC converter 50 to convert the second voltage outputted from the low voltage storage battery 30 into the first voltage for being supplied to the steering motor controller 10. When the high voltage system of the electric vehicle has an abnormal power failure, the battery manager controls the boost DC-DC convertor to convert the second voltage outputted from the low voltage storage battery into the first voltage for being supplied to the steering motor controller.

In other words, the high voltage power battery 20 does not supply power to the steering motor controller 10 directly. When the high voltage system of the electric vehicle is working, the boost DC-DC converter 50 and the buck DC-DC converter 40 work simultaneously, the buck DC-DC converter 40 converts the high voltage from the high voltage power battery 20 into the low voltage (such as DC, 24V) for being supplied to the low voltage storage battery 30. At the same time, the boost DC-DC converter 50 converts the low voltage outputted from the low voltage storage battery 30 into the high voltage for being supplied to the steering motor controller 10. When the high voltage system 70 of the electric vehicle has the abnormal power failure, the low voltage storage battery 30 provides power to the steering motor controller 10 via the boost DC-DC converter 50. In this embodiment, even the high voltage system 70 of the electric vehicle has the abnormal power failure, it does not affect the normal work of the steering motor controller 10 for a short time, and thus supplying power to the steering motor M without interruption.

With the steering power system for an electric vehicle according to embodiments of the present disclosure, when the high voltage system of the electric vehicle has the abnormal power failure, the boost DC-DC converter can convert the low voltage outputted from the low voltage storage battery into the high voltage for being supplied to the steering motor controller, such that the steering motor can still work for a short time when the abnormal power failure occurs to the high voltage system, thus avoiding a potential safety risk caused by a difficult turning for the steering wheel, improving the driving safety of the electric vehicle and meeting needs of users.

In the following, a method for controlling a steering power system for an electric vehicle is described in detail with reference to drawings.

Figure 7:
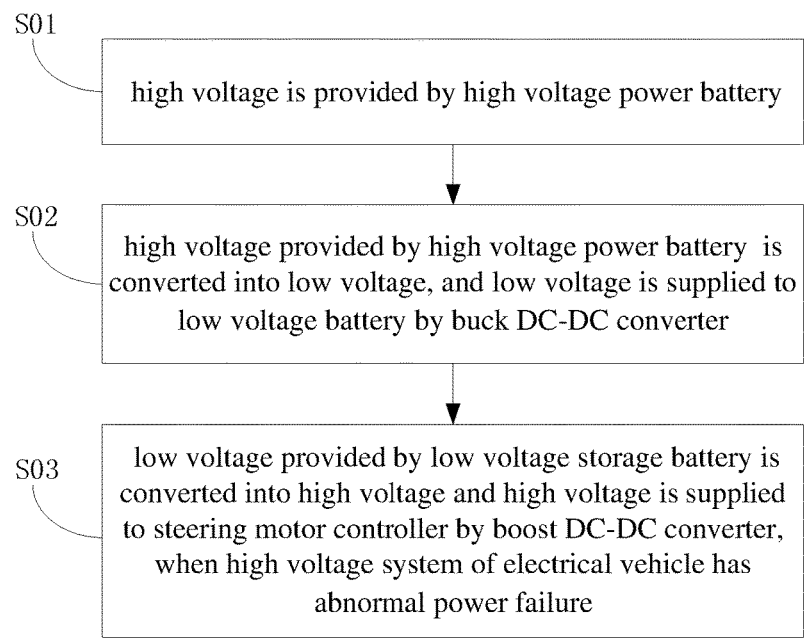
FIG. 7 is a flow chat of a method for controlling a steering power system for an electric vehicle according to an embodiment of the present disclosure.

FIG. 7 is a flow chat of a method for controlling a steering power system for an electric vehicle according to an embodiment of the present disclosure. The steering power system involved in the method may refer to the embodiments described above with reference to FIGS. 1-6, which shall not be described again herein.

As shown in FIG. 7, the method includes following steps.

At step S01, a high voltage is provided by a high voltage power battery for the electric vehicle, that is, the electric vehicle begins to work with the high voltage.

At step S02, the high voltage provided by the high voltage power battery is converted into a low voltage, and the low voltage is supplied to the low voltage storage battery by a buck DC-DC converter. In an embodiment, the battery manager may control the buck DC-DC converter to work.

At step S03, the low voltage provided by the low voltage storage battery is converted into the high voltage and the high voltage is supplied to a steering motor controller by a boost DC-DC converter, when the high voltage system of the electric vehicle has an abnormal power failure. In an embodiment, the battery manager may control the boost DC-DC converter to work.

In an embodiment, the control method further includes: detecting a voltage of a direct current bus capacitor by the steering motor controller.

In an embodiment, if the voltage of the direct current bus capacitor is less than a first predetermined voltage and a power off notification message is not sent by a battery manager, the battery manager determines the high voltage system of the electric vehicle has the abnormal power failure, and then controls the boost DC-DC converter to convert the second voltage provided by the low voltage storage battery into the first voltage and to supply the first voltage to the steering motor controller.

In an embodiment, when the high voltage system of the electric vehicle is working, the method further includes: controlling the high voltage power battery to supply power to the steering motor controller independently; controlling the buck DC-DC converter to convert the first voltage provided by the high voltage power battery into the second voltage and to supply the second voltage to the low voltage storage battery; and controlling the boost DC-DC converter to be in a standby mode. That is, when the high voltage system of the electric vehicle is working, the battery manager controls the high voltage power battery to supply power to the steering motor controller independently and controls the buck DC-DC converter to work, i.e., the buck DC-DC converter converts the high voltage outputted from the high voltage power battery into the low voltage for charging the low voltage storage battery, and the boost DC-DC converter is in the standby mode.

In an embodiment, the control method further includes: determining whether the voltage of the direct current bus capacitor is larger than a second predetermined voltage; if yes, controlling the high voltage power battery to supply power to the steering motor controller; if no, controlling the steering motor controller to stop working.

In an embodiment, as shown in FIG. 3, FIG. 4, and FIG. 5, in a normal situation, once the electric vehicle is provided with a high power, the battery manager controls the steering pre-charging contactor to turn on, the high voltage power battery charges the direct current bus capacitor, and the steering motor controller detects the voltage of the direct current bus capacitor in a real time and sends the voltage information of the direct current bus capacitor to the battery manager via the CAN bus. The battery manager determines whether the voltage of the direct current bus capacitor is larger than a second predetermined voltage (such as 90% of the total voltage of the high voltage power battery) after a time delay, if yes, the battery manager controls the steering contactor to turn on, the steering motor is working normally, at the same time, the steering pre-charging contactor is controlled to be turned off; if no, it is determined that the voltage of the direct current bus capacitor of the steering motor controller is too low, the steering motor controller cannot work i.e. the steering motor cannot work normally.

In an embodiment, when the steering motor is working normally, the battery manager controls the first DC-DC connector to turn on, and after receiving turn-on information of the first DC-DC connector from the battery manager, the buck DC-DC converter starts to work. As shown in FIG. 3, the high-voltage power battery supply power to the steering motor controller, the steering motor is working normally, at the same time, the battery manager controls the buck DC-DC converter to work, such that the high voltage power battery can charge the low voltage storage battery via the buck DC-DC converter, the boost DC-DC converter is in the standby mode. In this process, if only the electric vehicle runs normally, the high voltage power battery may keep charging the low voltage storage battery via the buck DC-DC converter, and the low voltage storage battery provides the power (such as 24V) to the low voltage electrical equipment on the electric vehicle.

In an embodiment, the battery manager receives the voltage information of the direct current bus capacitor C from the steering motor controller and sends the power off notification message when the power-off condition is met. When the voltage value is less than the first predetermined voltage (such as 80% of the total voltage of the high voltage power battery 20) and the power off notification message is not sent by the battery manager 60, the battery manager 60 determines that the high voltage system 70 of the electric vehicle has the abnormal power failure, and then controls the boost DC-DC converter 50 to work. As shown in FIG. 4, a discharging loop is: the first terminal (i.e., the positive terminal) of the boost DC-DC converter 50→the positive terminal of the steering motor controller 10→the negative terminal of the steering motor controller 10→the second terminal (i.e., the negative terminal) of the boost DC-DC converter 50. At this time, the boost DC-DC converter 50 converts the low voltage outputted from the low voltage storage battery 30 into the high voltage for being supplied to the steering motor controller 10, so as to control the steering motor M to work for a short time. When the received voltage value of the direct current bus capacitor C is less than the first predetermined voltage (such as 80% of the total voltage of the high voltage power battery 20) and the battery manager 60 sends the power off notification message, the battery manager 60 determines the high voltage of the electric vehicle is powered off normally.

Figure 8:
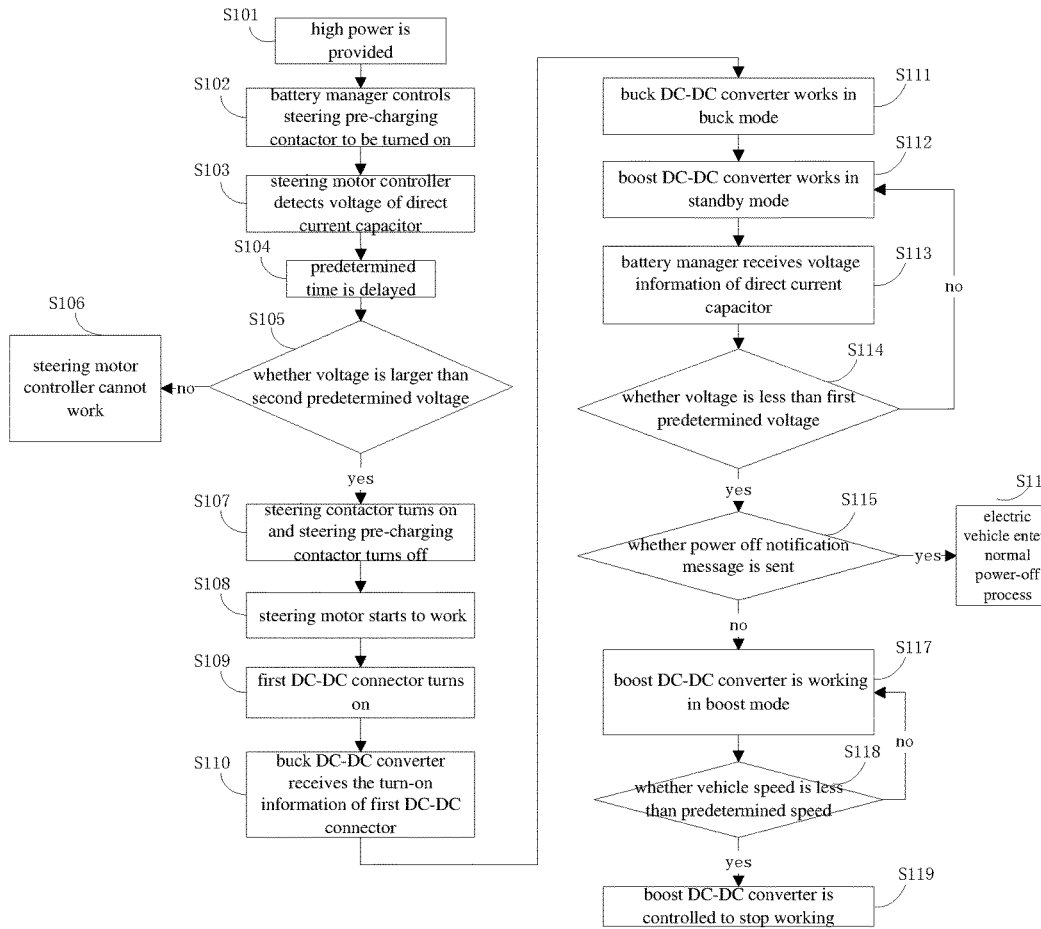
FIG. 8 is a flow chat of a method for controlling a steering power system for an electric vehicle according to another embodiment of the present disclosure.

FIG. 8 is a flow chat of a method for controlling a steering power system for an electric vehicle according to another embodiment of the present disclosure. As shown in FIG. 8, the control method includes following steps.

At step S101, the high voltage system of the electric vehicle is provided a high power.

At step S102, the battery manager controls the steering pre-charging contactor to be turned on.

At step S103, the steering motor controller detects the voltage of the direct current capacitor.

At step S104, a predetermined time is delayed. The predetermined time may be calibrated according to practice.

At step S105, the battery manager determines whether the voltage of the direct current capacitor is larger than the second predetermined voltage (i.e. 90% of the total voltage of the high voltage power battery), if yes, execute step S107; if no, execute step S106.

At step S106, since the voltage of the direct current bus capacitor of the steering motor controller is too low, the steering motor controller cannot work normally, i.e., the steering motor cannot work normally.

At step S107, the battery manager controls the steering contactor to be turned on and controls the steering pre-charging contactor to be turned off.

At step S108, the steering motor starts to work.

At step S109, the battery manager controls the first DC-DC connector to be turned on.

At step S110, the buck DC-DC converter receives the turn-on information of the first DC-DC connector from the battery manager.

At step S111, the buck DC-DC converter works in a buck mode, and the high voltage power battery charges the lower voltage battery via the buck DC-DC converter.

At step S112, the boost DC-DC converter works in the standby mode.

At step S113, the battery manager receives the voltage information of the direct current capacitor from the steering motor controller.

At step S114, the battery manager determines whether the voltage of the direct current capacitor is less than the first predetermined voltage (i.e. 80% of the total voltage of the high voltage power battery), if yes, execute step S115; if no, execute step S112.

At step S115, the battery manager determines whether the power off notification message is sent, if yes, execute step S116; if no, execute step S117.

At step S116, the electric vehicle enters a normal power-off process.

At step S117, the boost DC-DC converter works in the boost mode, and the low voltage storage battery supplies power to the steering motor controller via the boost DC-DC converter.

At step S118, the battery manager determines whether a vehicle speed is less than a predetermined speed such as 5 km/h, if yes, execute step S119; if no, execute step S117.

At step S119, the boost DC-DC converter is controlled to stop working.

Furthermore, in the driving process of the electric vehicle, the battery manager detects state information of the high voltage power battery, for example a detecting content may include whether the temperature of the high voltage power battery is too high, whether the voltage of the high voltage power battery is too low and whether the charging current is too large and so on. When a serious failure of the high voltage power battery is detected, the battery management sends the failure information of the high voltage power battery 20 to a display, controls the electric vehicle to drive in a limit speed, and sends the power-off notification message after a short delay, such as 15 seconds, so as to leave certain time for emergency treatment for the user. When the off button is pressed by the user, the battery manager also sends the power-off notification message such that the electric vehicle enters the normal power-off process.

In an embodiment, when the high voltage system of the electric vehicle is working, the method further includes: controlling the boost DC-DC converter and the buck DC-DC converter to work simultaneously so as to control the boost DC-DC converter and the high voltage power battery to supply power to the steering motor controller simultaneously.

In an embodiment, when the high voltage system of the electric vehicle is working, the method further includes: controlling the boost DC-DC converter and the buck DC-DC converter to work simultaneously, so as to control the boost DC-DC converter to supply power to the steering motor controller, and to control the buck DC-DC converter to supply power to the low voltage storage battery.

With the method for controlling a steering power system for an electric vehicle according to embodiments of the present disclosure, when the high voltage system of the electric vehicle has the abnormal power failure, the boost DC-DC converter can convert the second voltage outputted from the low voltage storage battery into the first voltage for being supplied to the steering motor controller, such that the steering motor can still work for a short time when the power failure occurs to the high voltage system, thus avoiding a potential safety risk caused by a difficult turning for the steering wheel, improving a driving safety of the electric vehicle and meeting needs of users.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A steering power system for an electric vehicle, comprising:
    a steering motor;
    a steering motor controller, connected with the steering motor and configured to control the steering motor;
    a high voltage power battery, configured to output a first voltage;
    a low voltage storage battery, configured to output a second voltage lower than the first voltage;
    a buck DC-DC converter, connected with the high voltage power battery and the low voltage storage battery respectively, and configured to convert the first voltage outputted from the high voltage power battery into the second voltage for being supplied to the low voltage storage battery, when a high voltage system of the electric vehicle is working;
    a boost DC-DC converter, connected with the low voltage storage battery and the steering motor controller respectively, and configured to convert the second voltage outputted from the low voltage storage battery into the first voltage, and
    a battery manager, connected with the steering motor controller, the buck DC-DC converter and the boost DC-DC converter respectively via a CAN bus, and configured to send a power off notification message to control the high voltage system of the electric vehicle to stop working, wherein the steering motor controller detects that the voltage of the direct current bus capacitor steadily drops,
    wherein when the high voltage system of the electric vehicle has an abnormal power failure, the boost DC-DC convertor converts the second voltage outputted from the low voltage storage battery into the first voltage for being supplied to the steering motor controller, and the battery manager is configured to control the boost DC-DC converter and the buck DC-DC converter to work simultaneously so that the boost DC-DC converter and the high voltage power battery to supply power to the steering motor controller simultaneously, when the high voltage system of the electric vehicle is working.

2. The steering power system of claim 1, wherein the steering motor controller comprises: a direct current bus capacitor, an inverter, and a detecting unit;
    wherein the direct current bus capacitor is connected with direct current input terminals of the inverter in parallel, and the detecting unit is configured to detect a voltage of the direct current bus capacitor.

3. The steering power system of claim 2, wherein input terminals of the buck DC-DC converter are connected with the high voltage power battery in parallel via a first DC-DC connector, output terminals of the buck DC-DC converter are connected with the low voltage storage battery in parallel, input terminals of the boost DC-DC converter are connected with the low voltage storage battery in parallel, output terminals of the boost DC-DC converter are connected with the direct current bus capacitor in parallel, and the high voltage power battery is connected with the direct current bus capacitor in parallel.

4. The steering power system of claim 2, further comprising:

a steering contactor, having a first terminal connected with a first terminal of the high voltage power battery and a second terminal; and a diode, having an anode connected with the second terminal of the steering contactor and a cathode connected with a first terminal of the direct current bus capacitor, wherein a second terminal of the direct current bus capacitor is connected with a second terminal of the high voltage power battery.

5. The steering power system of claim 4, further comprising:
   a steering pre-charging contactor having a first terminal connected with the first terminal of the steering contactor and a second terminal; and
   a pre-charging resistor having a first terminal connected with the second terminal of the steering pre-charging contactor and a second terminal connected with the cathode of the diode.

6. The steering power system of claim 2, wherein input terminals of the buck DC-DC converter are connected with the high voltage power battery in parallel via a second DC-DC connector, output terminals of the buck DC-DC converter are connected with the low voltage storage battery in parallel, input terminals of the boost DC-DC converter are connected with the low voltage storage battery in parallel, and output terminals of the boost DC-DC converter are connected with the direct current bus capacitor in parallel.

7. The steering power system of claim 1, wherein the battery manager is further configured to:
   control the high voltage power battery to supply power to the steering motor controller independently, and control the buck DC-DC converter to work when the high voltage system of the electric vehicle is working;
   control the boost DC-DC converter to be in a standby mode; and
   determine that the high voltage system of the electric vehicle has the abnormal power failure when the voltage of the direct current bus capacitor is less than a first predetermined voltage and the power off notification message is not sent by the battery manager, and control the boost DC-DC converter to work.

8. The steering power system of claim 1, wherein the battery manager is further configured to:
   control the boost DC-DC converter to supply power to the steering motor controller independently, when the high voltage system of the electric vehicle has the abnormal power failure.

9. The steering power system of claim 1, wherein the low voltage storage battery is further configured to supply power to a low voltage system of the electric vehicle.

10. The steering power system of claim 1, wherein the battery manager is further configured to:
    control the buck DC-DC converter to convert the first voltage outputted from the high voltage power battery into the second voltage to charge the low voltage storage battery, control the boost DC-DC converter to convert the second voltage outputted from the low voltage storage battery into the first voltage for being supplied to the steering motor controller, when the high voltage system of the electric vehicle is working; and
    control the boost DC-DC convertor to convert the second voltage outputted from the low voltage storage battery into the first voltage for being supplied to the steering motor controller, when the high voltage system of the electric vehicle has an abnormal power failure.

11. A method for controlling a steering power system for an electric vehicle, comprising:
    providing a first voltage by a high voltage power battery;
    converting the first voltage provided by the high voltage power battery into a second voltage lower than the first voltage and supplying the second voltage to a low voltage storage battery by a buck DC-DC converter, when a high voltage system of the electric vehicle is working;
    converting the second voltage provided by the low voltage storage battery into the first voltage and supplying the first voltage to a steering motor controller by a boost DC-DC converter, when the high voltage system of the electric vehicle has an abnormal power failure, and
    controlling the boost DC-DC converter and the buck DC-DC converter to work simultaneously so as to control the boost DC-DC converter and the high voltage power battery to supply power to the steering motor controller simultaneously.

12. The method of claim 11, further comprising:
    detecting a voltage of a direct current bus capacitor by the steering motor controller.

13. The method of claim 12, wherein
    if the voltage of the direct current bus capacitor is less than a first predetermined voltage and a power off notification message is not sent by a battery manager, the battery manager determines the high voltage system of the electric vehicle has the abnormal power failure, and then controls the boost DC-DC converter to convert the second voltage provided by the low voltage storage battery into the first voltage and to supply the first voltage to the steering motor controller.

14. The method of claim 12, further comprising:
    determining whether the voltage of the direct current bus capacitor is larger than a second predetermined voltage;
    if yes, controlling the high voltage power battery to supply power to the steering motor controller;
    if no, controlling the steering motor controller to stop working.

15. The method of claim 11, when the high voltage system of the electric vehicle is working, further comprising:
    controlling the high voltage power battery to supply power to the steering motor controller independently;
    controlling the buck DC-DC converter to convert the first voltage provided by the high voltage power battery into the second voltage and to supply the second voltage to the low voltage storage battery; and
    controlling the boost DC-DC converter to be in a standby mode.

16. The method of claim 11, when the high voltage system of the electric vehicle is working, further comprising:
    controlling the boost DC-DC converter and the buck DC-DC converter to work simultaneously, so as to control the boost DC-DC converter to supply power to the steering motor controller, and to control the buck DC-DC converter to supply power to the low voltage storage battery.

* * * * *